PROCESS FOR REMOVAL OF MOISTURE AND/OR SOLVENTS FROM TEXTILE MATERIAL

Original Filed Oct. 31, 1968 3 Sheets-Sheet 1

United States Patent Office

Re. 27,995
Reissued Apr. 30, 1974

27,995

PROCESS FOR REMOVAL OF MOISTURE AND/OR SOLVENTS FROM TEXTILE MATERIAL

Frederick C. Wedler, Greensboro, N.C., assignor to Burlington Industries, Inc., Greensboro, N.C.

Original No. 3,630,660, dated Dec. 28, 1971, Ser. No. 772,264, Oct. 31, 1968. Application for reissue Oct. 17, 1972, Ser. No. 298,395
Int. Cl. D01c *1/00*
U.S. Cl. 8—139 9 Claims

Matter enclosed in heavy brackets [ ] appears in the original patent but forms no part of this reissue specification; matter printed in italics indicates the additions made by reissue.

ABSTRACT OF THE DISCLOSURE

A process and apparatus for removing water and/or other solvents from textile materials during the treatment of the same. The textile material which has been treated by scouring with a solvent or with a solvent containing a treatment material, or a textile which has been treated by a solvent media for the application of chemicals, dyestuffs, or the like, is subjected to vacuum, and if desired, to a predetermined controlled temperature for a predetermined controlled time period in order to remove residual solvent from the textile, and from any desired treating materials. In the situation where the treating material is a solvent media with chemicals or dyestuffs, the temperature may be elevated above that necessary to vaporize the residual solvent so that the chemicals or dyestuffs may react and be deposited on the textile material and be affixed thereto.

A solvent can be defined as "that which dissolves," i.e., a medium into which other materials can be put into solution or suspension to give fluency. Water is the most generally used solvent, and is treated here in the same context as the low-boiling hydrocarbon solvents, that is, a solvent to be recovered.

The present invention is concerned with certain improvements in the treating of textile materials, preferably in web form, so that the material may be continuously treated, although it is contemplated that the process and apparatus is applicable for a batch treatment.

In the copending U.S. application Ser. No. 746,972, filed July 23, 1968, of Frederick C. Wedler and Kenneth Y. Wang there is disclosed a process and apparatus wherein a textile material is degassed prior to impregnation of the same with a treating agent. By degassing the textile material prior to treating with a treating agent, impregnation and penetration of the treating agent is more effectively and conveniently accomplished. In the copending U.S. application Ser. No. 746,973, filed July 23, 1968, by Frederick C. Wedler, a somewhat similar process is disclosed utilizing the degassing principle, but in a batch treatment of textile material. The present invention is related to, and is an improvement of the inventions of the aforementioned applications, but it utilizes a vacuum not merely to degas the textile material but to vaporize any moisture such as water and/or solvent in the material after certain treating operations, so that the textile material emerges from the vacuum treatment in a substantially dry condition, ready for any desired subsequent treatment. Additionally, the present invention contemplates removing, by use of vacuum and temperature, if desired, the solvent from a system in which the textiles are treated or materials are applied, such as chemicals or dyestuffs. Such removal of solvent effectively causes the reaction and fixation of the applied materials to the textile material, the textile material still emerging from the treatment in a dry condition, if desirable.

Heretofore in the textile industry, solvents have been removed from textile materials by application of steam, hot water, hot air, or by contact with hot cylinders. While these systems have been sufficiently rapid and inexpensive to permit use in present practice, they have not permitted satisfactory complete removal of the solvent vapor from the treated material or from the treatment atmosphere. As a minimum, this has resulted in odorous contamination of the treatment atmosphere and some loss of solvent on a continuous basis from the material and the atmosphere. More particularly, it has simply not been possible, through present solvent removal procedures, to rapidly obtain almost complete removal and recovery, if desired, of solvent from the treated material, and of solvent vapor from the treatment atmosphere, rapidly and effectively, simply for economic recovery and safety, or to permit further uncontaminated treatment in rapid succession, or to rapidly follow another treatment and ready the treated material for final use or delivery.

Removal of solvent from the treatment atmosphere is critically important when high temperatures are subsequently employed, sufficient to break down the solvent and form poisonous gases. Such complete removal of solvent is not possible with conventional systems that remove both solvent and moisture.

Accordingly, a principal object of the present invention is to provide an improved process and apparatus for removing moisture such as water and/or other solvents from textile or other materials, the process and apparatus contemplating the complete recovery of the solvent and the substantial drying of the treated material.

It is another important object to provide an improved process and apparatus to provide for removal of solvent vapor from the treatment atmosphere in a textile, or other material, treating step.

Ancillary to the preceding objects, it is a further object of the present invention to provide a process and an apparatus which will not only remove and recover solvents by utilizing a vacuum and controlled temperatures, but will also assist in causing improved reaction and fixation of chemicals or dyestuffs to the textile material when such chemicals or dyestuffs are utilized in a solvent media.

Another important object of the present invention is to provide an improved process and apparatus for removal and recovery of solvents from textile material and from the atmosphere in the treating zone in a minimum of time at any selected temperatures in a vacuum, the temperature being either reduced, ambient or elevated, and the textile material emerging substantially dry whereby further treatment may be immediately accomplished if desired.

While the process of the present invention is capable of use in the batch treatment of various types of textile materials, the process will be described in relationship to an embodiment for the removal of moisture and/or solvents from the textile material by a continuous treatment of the same, either following a treatment involving some application of solvent or moisture to the textile, or in a treatment involving the deposition of material on the textile from solvent media, or as a prelude to a subsequent treatment step requiring solvent free material and/or atmosphere. Additionally, the invention will be described in the treatment of textile material in the form of webs or continuous lengths of materials such as woven, nonwoven, knitted- or stitch-bonded fabrics, multifilament yarns, yarn bundles, sliver, roving, tow, or the like, but it will be appreciated that materials other than the foregoing "conventional" textiles, such as paper, leather, plastic and the like, may utilize the process and apparatus described herein.

Broadly stated, the present invention involves the passing of a textile or other weblike or continuous yarnlike material through a vacuum chamber, the material having moisture and/or a residual solvent therein prior to entry into the chamber. For example, the textile material may have been scoured in a solvent scouring liquid or it may have had a solvent media comprising a solvent and a chemical or dyestuff or the like applied thereto. By controlling the vacuum within the chamber, and by controlling the temperature, if desired, within the chamber, as well as the length of time for the textile or other material to pass through the chamber, all or most of the residual solvent may be removed and recovered for reuse, both from the material, and from the surrounding atmosphere. That is, it is necessary first to remove the solvent from the treated substrate, and second to remove solvent vapor from the treatment chamber to a point where it can be condensed and recovered.

Additionally, control of the heat within the chamber can be such that it will cause reaction and fixation of any chemicals or dyestuffs on the textile material passed through the chamber simultaneously with the removal of the solvents. By utilizing a vacuum within the chamber, the temperature for causing flashing or vaporization of the solvents can be materially reduced as well as the time for removing such solvents from the textile material. The advantages of this relationship will be appreciated from Table I.

TABLE I

Boiling points of chlorinated solvents at reduced pressure

Tabularized below are the boiling points of perchloroethylene, trichloroethylene, and water at various reduced pressures, both in terms of absolute pressure and vacuum applied. Temperature of the boiling point related to each pressure is given in both Fahrenheit and centigrade.

| | | | | | | | | | | |
|---|---|---|---|---|---|---|---|---|---|---|
| Vacuum (inches) | 0 | 14 | 22 | 26 | 27.5 | 28.3 | 29.1 | 29.5 | 29.7 | 20.9 |
| Pressure (mm.) | 760 | 400 | 200 | 100 | 60 | 40 | 20 | 10 | 5 | 1 |
| Perchloroethylene: | | | | | | | | | | |
| ° F | 250 | 212 | 176 | 142 | 122 | 104 | 79 | 57 | 34 | −4 |
| ° C | 121 | 100 | 80 | 61 | 49 | 40 | 26 | 14 | 2 | −21 |
| Trichloroethylene: | | | | | | | | | | |
| ° F | 189 | 153 | 118 | 88 | 68 | 41 | 30 | 10 | −8 | −47 |
| ° C | 587 | 67 | 48 | 31 | 20 | 5 | −1 | −12 | −23 | −44 |
| Water: | | | | | | | | | | |
| ° F | 212 | 181 | 151 | 126 | 108 | 93 | 72 | 52 | 33 | ------- |
| ° C | 100 | 83 | 66 | 52 | 42 | 34 | 22 | 11 | 1.0 | ------- |

It will be obvious from Table I that as the atmospheric pressure is reduced, that the temperature for vaporization of the solvents is also reduced as is the time for vaporization. After the solvent removed from the textile material has been vaporized, the solvent in vapor form is condensed and separately removed from the chamber so that it can be recovered and reused for treatment of other textile material. This effect can of course be accentuated where desired, by increase of the temperature of any given pressure to accelerate vaporization. Similarly, great care can be exercised by reduced temperature and a slower rate of vaporization, if desired.

The foregoing objects and advantages of the present invention and a more detailed description of the same will be made by reference to the accompanying specification, claims and drawings in which:

Figure 1:
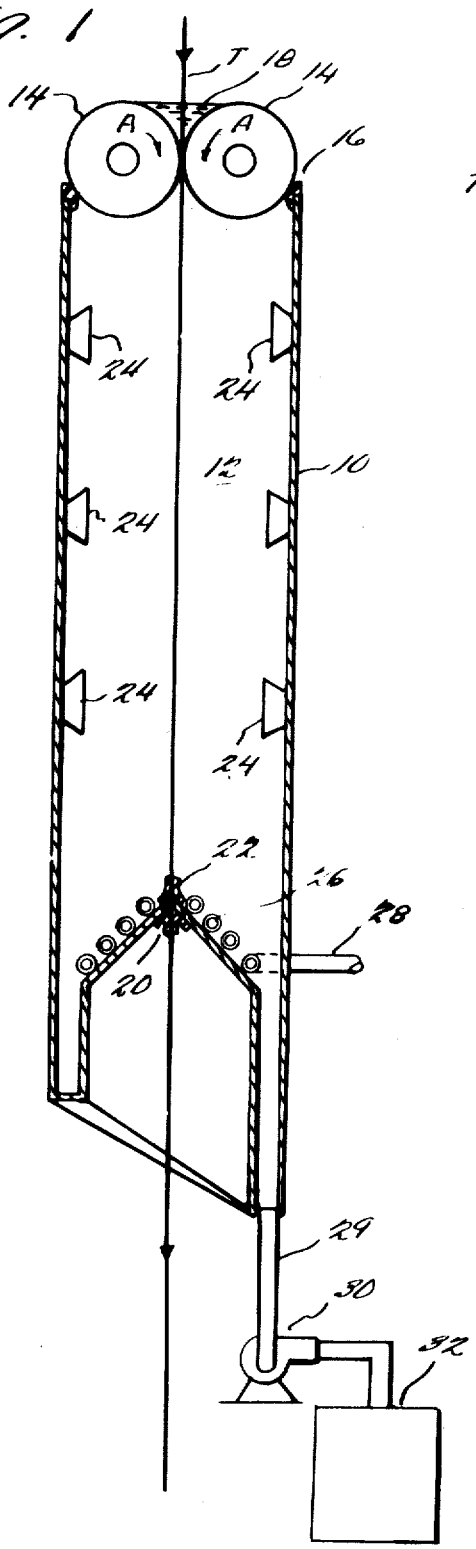
FIG. 1 illustrates a diagrammatic vertical sectional view of an improved apparatus for accomplishing the process of the present invention, the same utilizing nip rolls for padding the textile material and sealing for entry to the vacuum chamber.

Referring now to the drawings wherein like character and reference numerals represent like or similar parts and in particular to FIG. 1, there is illustrated an elongated boxlike structure 10 defining a vacuum chamber 12. The rigid boxlike structure 10 may be made of stainless steel or other suitable material and must be capable of withstanding either a partial vacuum or a full vacuum.

A pair of rubber-sealing rollers 14 provide a seal for an inlet opening 16 of the chamber 12, the textile material T passing into the chamber 12 through the nip of the rollers 14. The nip of the rollers 14 is filled with a solvent media 18 containing a solvent and a chemical or dyestuff and this is applied by padding to the textile material T as it is passed through the rollers into the chamber. Of course, a suitable motor (not shown) is utilized to drive the rollers 14 in the direction shown by the arrows A.

Outlet opening 20 for the chamber 12 is provided with a suitable vacuum seal 22 through which the textile material T passes out of the chamber 12. Within chamber 12 there is provided means 24 for heating the chamber 12, the means being infrared, dielectric, radiant, or other types of heaters. Suitable control means (not shown) are provided for the heater means 24 so that the heat within the chamber can be controlled to a desired temperature for a particular treatment. At the lower end of the chamber 12, a plurality of cooling coils are provided, the cooling coils 26 receiving a coolant through a conduit 28 from a suitable condenser. The purpose of the cooling coils 26 is to condense the solvent vapor when the same contacts the coils, the solvent vapor being condensed to a liquid and withdrawn from the chamber 24 by a vacuum pump 30 through a conduit 29 and then discharged into a tank 32 where it may be reclaimed for reuse. This apparatus is to be treated as illustrative only however, as the solvent vapor recovered could easily be condensed elsewhere, preferably at a point removed from the vacuum treatment chamber 10.

Figure 2:
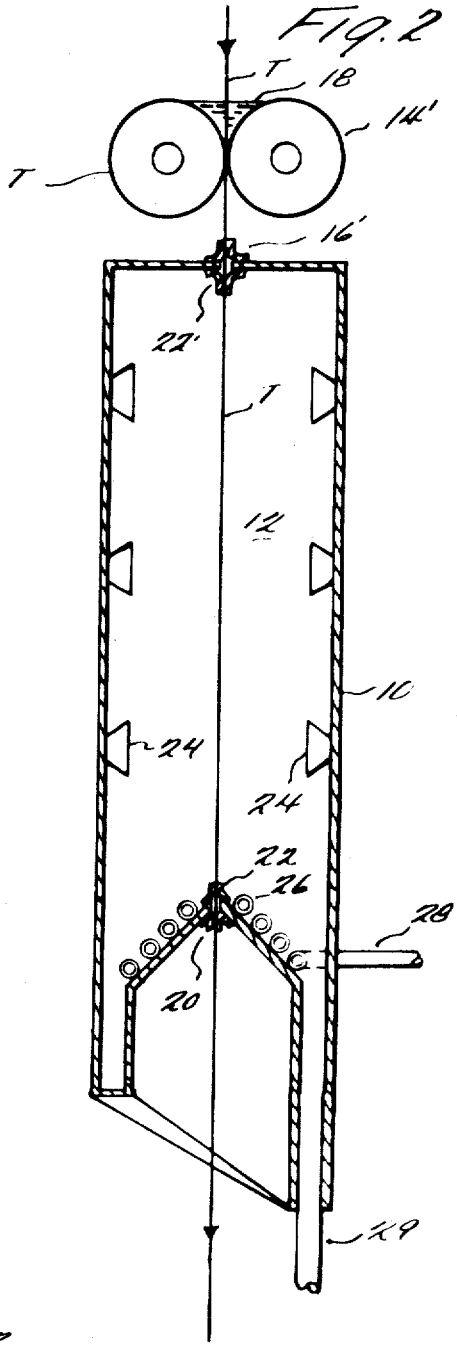
FIG. 2 is a diagrammatic vertical sectional view similar to FIG. 1 but providing a separate vacuum seal for the inlet to the vacuum chamber, the material passing through a pair of nip rolls for padding or applying the solvent media prior to passing through the vacuum seal.

The apparatus of FIG. 2 is substantially identical to that of FIG. 1 except that the inlet opening 16' is provided with a vacuum seal 22' similar to the outlet vacuum seal 22. In the FIG. 2 environment, the pair of padder rolls 14' for applying the solvent media 18 are located immediately adjacent the vacuum seal 22' but do not in themselves provide the inlet seal as do the padder rolls 14.

Figure 3:
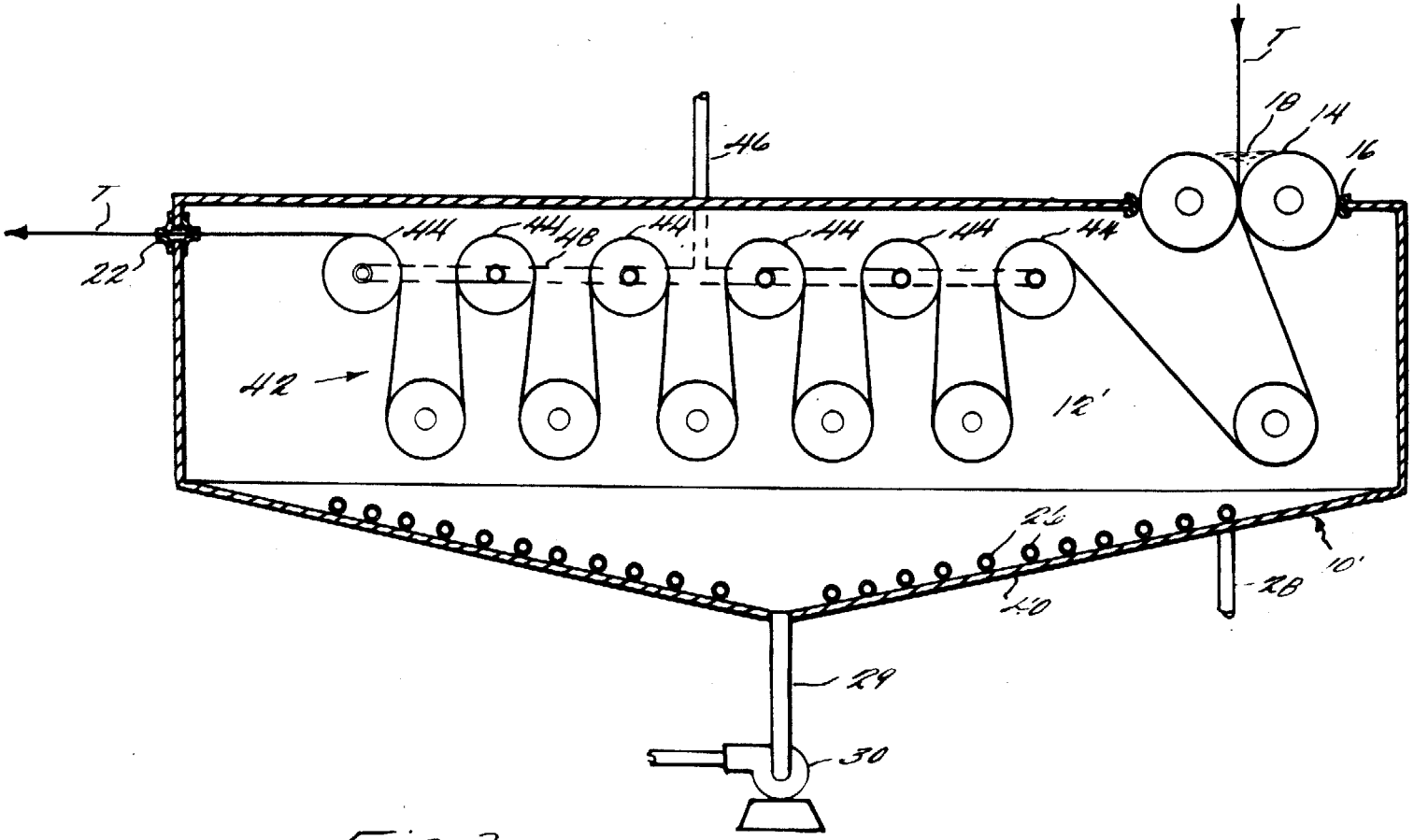
FIG. 3 illustrates a vertical sectional view through a further modified form of the apparatus of the present invention; the textile material passing through the apparatus in a generally horizontal direction.

In the apparatus disclosed in FIG. 3, the rigid boxlike structure 10' has a substantially horizontally extending vacuum chamber 12'. An inlet opening 16, which is identical to the opening 16 of FIG. 1, is provided at one end of the structure 10' in the top wall thereof. The opening 16 has rubber-sealing rollers 14 associated therewith which act not only as a means for padding the textile material with the solvent media 18 but also as a vacuum seal for the inlet opening 16. At the opposite end of the structure 10', in an end wall of the same, there is provided an exit vacuum seal 22 for the outlet opening 20.

The bottom wall of the tank 10' is sloped as indicated at 40 and the wall is provided on the interior thereof with a plurality of coolant coils 26 supplied with coolant through the conduit 28 for the purpose of condensing the vaporized solvent, the same draining through the discharge conduit 29 and drawn therethrough by the vacuum pump 30 for reclaiming.

The chamber 12' of the boxlike structure 10' differs in that the textile material is fed in series over a plurality of rollers generally designated at 42, the upper rollers of cylinders 44 being hollow and arranged to receive steam or hot water within the same for the purpose of heating the same. As shown in the drawing, an inlet steam conduit 46 extending from a suitable steam generator (not shown) is provided for applying the steam or hot water to the upper rollers, the conduit 46 being connected with a manifold 48 leading individually to and supplying the rollers with the steam.

In each of the apparatus disclosed in FIGS. 1 through 3, the textile material passes into a vacuum chamber with a solvent media thereon and then continuously passes from the chamber in a completely dry state with the solvent of the solvent media being vaporized from the chamber and then being condensed and withdrawn therefrom in liquid form for reuse. By controlling the heat, the chemicals or dyestuffs of the solvent media will react and be fixed to the textile material T. Of course, the temperature must be elevated at least to a controlled degree sufficient to cause vaporization of the solvent at the particular vacuum applied. However, this temperature is considerably lower than the temperature necessary for vaporization at atmospheric pressure. As will now be obvious, when the textile material is discharged from the vacuum chambers, it will have all of the solvent removed, the solvent being recovered and the textile material being dry and ready for any subsequent treatment.

Figure 4:
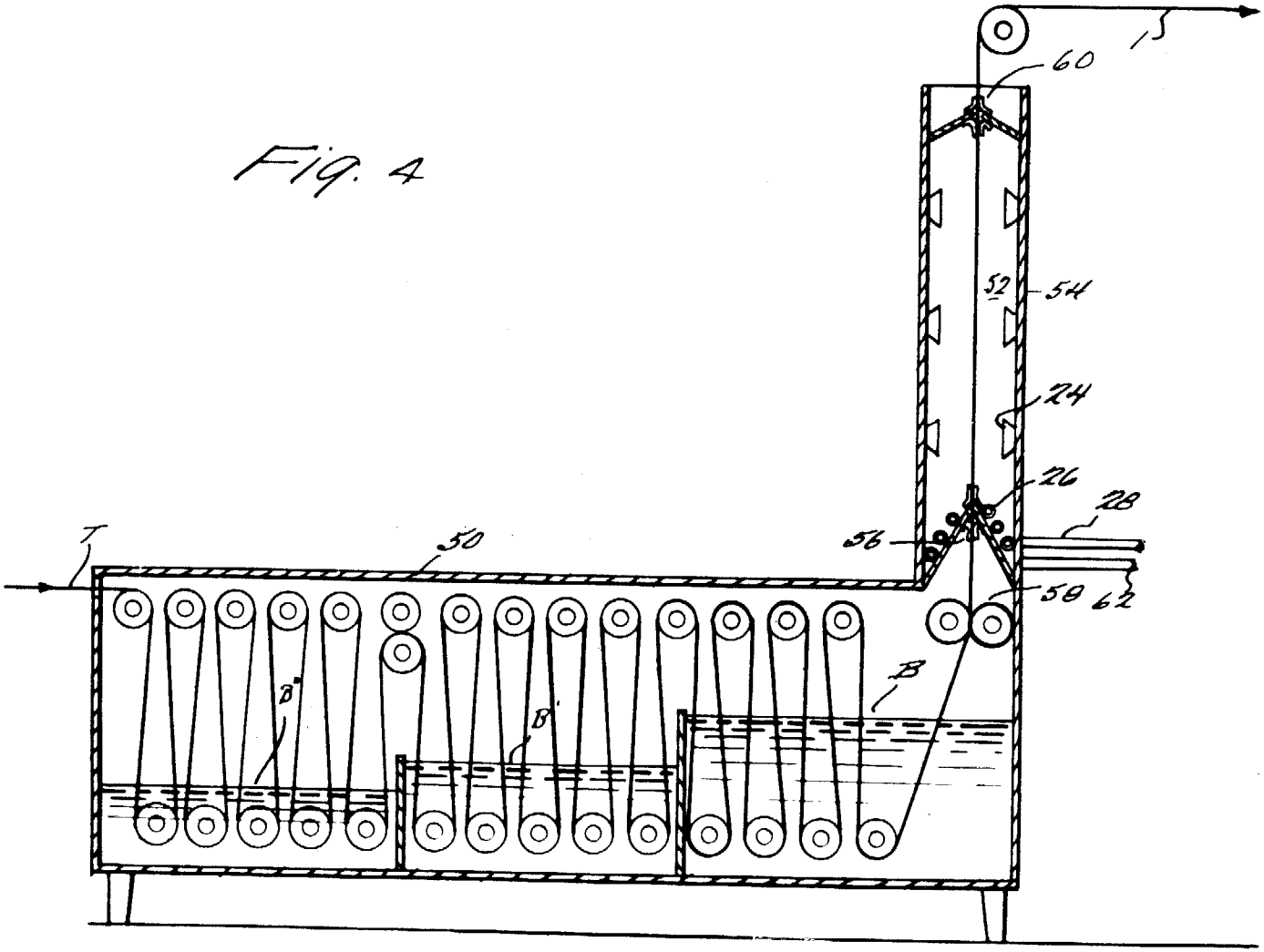
FIG. 4 is a diagrammatic vertical sectional view of a still further modified form of the apparatus, the view illustrating the use of the vacuum chamber with a solvent scouring device.

Referring now to FIG. 4, there is diclosed a further modification of the present invention wherein a scouring tank 50 of the conventional type is used to scour the textile material T' prior to its entry into a vacuum chamber 52 of the boxlike structure 54. It will be noted that the scouring tank 50 is provided with a series of baths B, B' and B'', the baths being a scouring solution including a solvent. As will be appreciated by those skilled in the art, the bath B has the strongest solution therein, the other baths B' and B'' receiving the overflow respectively from the adjacent bath.

Between the vacuum chamber 52 and the interior of the tank 50 there is an inlet vacuum seal 56 through which a textile material T passes as it leaves the tank 50 and enters the chamber 52. Just prior to passing through the seal 56, the textile material T goes through a pair of pressure rolls 58 which squeeze excess scouring solution from the same, the solution dropping into the bath B. The heaters 24 within the vacuum chamber 52 vaporize any solvent left in the textile material T and by the time the textile material is discharged from the exit vacuum seal 60, it will be dry with all solvent having bean removed by vaporization of the same, the solvent itself being reclaimed by condensing on the coils 26 and withdrawing from the chamber 52 through a line 62 to a vacuum pump and reservoir (not shown). Understanding of the invention should not be limited to the drawing embodiments shown, since, as explained above, the vacuum treatment can either precede or follow another treatment step, or the treatment can take place as an integral part of the vacuum removal step, by deposition of material, curing, etc. A desirable embodiment would be utilization of the invention following conventional steam solvent flash off. Typically, this leaves 0.5–1 percent residual solvent, in a fairly rapid and economic process. Further solvent recovery is of course impossible with the conventional steam system. Such a procedure could be followed by the device 10 according to the drawings, or other modification, and realize substantially complete solvent removal/recovery.

While it will be appreciated that the process of the present invention is capable of use with a partial vacuum up to a full vacuum for removal and recovering of solvents, it has been found that the best range for vacuum is between 14 and 29.9 inches of mercury. In this connection, Table I above represents a relationship between the flash point of different solvents at atmospheric pressure, and various levels of vacuum. This should be considered as illustrative, and not limiting on the invention.

What is claimed is:

1. A process for the treatment of textile material in web or [continuous length] *sheet* form including removing a liquid solvent media entrained in the textile material comprising the steps of: subjecting the textile material to a relatively strong vacuum in an enclosed zone; controlling the temperature within the enclosed zone so that the temperature is elevated sufficiently to vaporize the solvent; removing the textile material from the enclosed zone, condensing *within the enclosed zone* the evaporated solvent removed from the textile material, collecting *within the enclosed zone* the so-condensed liquid and withdrawing it from the enclosed zone separately from the removal of the textile material from the enclosed zone, *and wherein the textile material is continuously moved through the enclosed zone.*

[2. The process of claim 1 wherein the textile material is continuously moved through the enclosed zone.]

3. The process of claim 1 wherein the material is subjected to the vacuum and temperature for a predetermined length of time sufficient to essentially dry the textile material.

4. The process of claim 3 wherein the textile material is treated with said solvent prior to entry into the enclosed zone.

5. The process of claim 4 in which the temperature within the enclosed zone is elevated above the flash point temperature for the solvent.

6. The process of claim 3 in which the temperature in the enclosed zone is elevated by heating means.

7. The process of claim 3 in which the textile material is brought into contact with a heated surface to elevate the temperature of the same.

8. The process of claim 4 in which the solvent is a scouring agent.

9. The process of claim 8 in which the textile material is squeezed after scouring and prior to entry into the enclosed zone so as to remove as much of the scouring solvent as possible, the remaining portion of the scouring solvent being removed in the enclosed zone.

10. A process as defined in claim 8 wherein the solvent-scouring agent is selected from the group consisting of perchloroethylene and trichloroethylene.

References Cited

The following references, cited by the Examiner, are of record in the patented file of this patent or the original patent.

UNITED STATES PATENTS

| | | | |
|---|---|---|---|
| 2,441,991 | 5/1948 | Converse et al. | 8—139 |
| 3,476,504 | 11/1969 | Case et al. | 8—139 |

FOREIGN PATENTS

| | | |
|---|---|---|
| 797,075 | 6/1958 | Great Britain. |
| 1,152,657 | 5/1969 | Great Britain. |

MAYER WEINBLATT, Primary Examiner

U.S. Cl. X.R.

8—139.1, 142